United States Patent
Ramakrishnan

(10) Patent No.: US 7,895,067 B2
(45) Date of Patent: Feb. 22, 2011

(54) SYSTEMS AND METHODS FOR OPTIMIZING TOTAL MERCHANDISE PROFITABILITY

(75) Inventor: Vishwamitra S. Ramakrishnan, Belmont, MA (US)

(73) Assignee: Oracle International Corp., Redwood Shores, CA (US)

( * ) Notice: Subject to any disclaimer, the term of this patent is extended or adjusted under 35 U.S.C. 154(b) by 1383 days.

(21) Appl. No.: 11/297,796

(22) Filed: Dec. 8, 2005

(65) Prior Publication Data

US 2006/0161465 A1 Jul. 20, 2006

Related U.S. Application Data

(60) Provisional application No. 60/634,428, filed on Dec. 8, 2004.

(51) Int. Cl.
G06F 9/44 (2006.01)
(52) U.S. Cl. .................. 705/7; 705/10; 705/28
(58) Field of Classification Search .......... None
See application file for complete search history.

(56) References Cited

U.S. PATENT DOCUMENTS

| | | | | |
|---|---|---|---|---|
| 5,615,109 | A * | 3/1997 | Eder | 705/8 |
| 6,006,196 | A * | 12/1999 | Feigin et al. | 705/10 |
| 6,308,162 | B1 | 10/2001 | Ouimet et al. | 705/7 |
| 6,366,890 | B1 * | 4/2002 | Usrey | 705/10 |
| 6,553,352 | B2 | 4/2003 | Delurgio et al. | 705/400 |
| 6,834,266 | B2 * | 12/2004 | Kumar et al. | 705/10 |
| 6,910,017 | B1 * | 6/2005 | Woo et al. | 705/10 |
| 6,931,350 | B2 * | 8/2005 | Zhang | 702/179 |
| 6,960,135 | B2 * | 11/2005 | Gaidarev et al. | 463/25 |
| 7,006,981 | B2 * | 2/2006 | Rose et al. | 705/10 |
| 7,249,031 | B2 * | 7/2007 | Close et al. | 705/20 |
| 7,249,033 | B1 * | 7/2007 | Close et al. | 705/10 |
| 7,302,410 | B1 * | 11/2007 | Venkatraman et al. | 705/35 |
| 7,424,440 | B1 * | 9/2008 | Gupta et al. | 705/10 |
| 7,454,374 | B2 * | 11/2008 | Xu et al. | 705/35 |
| 7,596,521 | B2 * | 9/2009 | Lepman | 705/35 |
| 7,617,119 | B1 * | 11/2009 | Neal et al. | 705/10 |
| 7,653,561 | B2 * | 1/2010 | Bergstrom | 705/7 |
| 7,660,734 | B1 * | 2/2010 | Neal et al. | 705/10 |
| 7,660,736 | B2 * | 2/2010 | Kalyan | 705/10 |

(Continued)

OTHER PUBLICATIONS

Dan Scheraga. (Mar. 2004). Pricing to Sell. Chain Store Age, 80(3), 52. Retrieved Feb. 23, 2010, from ABI/INFORM Global.*

(Continued)

*Primary Examiner*—Romain Jeanty
*Assistant Examiner*—Gurkanwaljit Singh

(57) ABSTRACT

In one such aspect, the invention provides a method for optimizing merchandise profitability that includes the step of modeling gross margin as a function of product breadth and depth for each of at least one class of goods retailed by each of at least one retail site in a group of sites of the retail enterprise, and as a function of the expected discount price for each such class of goods at each such retail site. The method further includes maximizing the gross margin so modeled to the enterprise and, from that maximization, determining for at least one such retail site an optimal breadth, depth, and/or discount price, for at least one such class of goods retailed by it.

25 Claims, 2 Drawing Sheets

U.S. PATENT DOCUMENTS

| | | | | |
|---|---|---|---|---|
| 2001/0047293 A1* | 11/2001 | Waller et al. | ........... | 705/10 |
| 2002/0035537 A1 | 3/2002 | Waller et al. | ........... | 705/37 |
| 2002/0147630 A1* | 10/2002 | Rose et al. | ........... | 705/10 |
| 2003/0050817 A1* | 3/2003 | Cargille et al. | ........... | 705/8 |
| 2003/0050826 A1* | 3/2003 | Cargille et al. | ........... | 705/10 |
| 2003/0050870 A1* | 3/2003 | Cargille et al. | ........... | 705/28 |
| 2003/0074251 A1* | 4/2003 | Kumar et al. | ........... | 705/10 |
| 2003/0104861 A1* | 6/2003 | Gaidarev et al. | ........... | 463/25 |
| 2003/0171978 A1 | 9/2003 | Jenkins et al. | ........... | 705/10 |
| 2003/0220773 A1* | 11/2003 | Haas et al. | ........... | 703/2 |
| 2004/0267582 A1* | 12/2004 | Xu et al. | ........... | 705/7 |
| 2005/0096963 A1* | 5/2005 | Myr et al. | ........... | 705/10 |
| 2006/0195345 A1* | 8/2006 | Close et al. | ........... | 705/7 |

OTHER PUBLICATIONS

Japan: New retail business: Successful efficiency operation. (Dec. 2000). JTN Monthly,(553), 38. Retrieved Feb. 23, 2010, from ProQuest Asian Business and Reference.*

Kim, Sook-Hyun (2003). The model for the evolution of retail institution types in South Korea. Ph.D. dissertation, Virginia Polytechnic Institute and State University, United States—Virginia.*

Tom Brijs, Gilbert Swinnen, Koen Vanhoof and Geert Wets "Building an Association Rules Framework to Improve Product Assortment Decisions" Data Mining and Knowledge Discovery vol. 8 , Issue 1 (Jan. 2004) pp. 7-23.*

Berkowitz, Eric N., et al., "Marketing", Irwin, Third Edition, 1992, pp. 446-458.

PCT International Search Report, Feb. 21, 2007, pp. 1-2.

* cited by examiner

SYSTEMS AND METHODS FOR OPTIMIZING TOTAL MERCHANDISE PROFITABILITY

CROSS-REFERENCE TO RELATED APPLICATIONS

This application claims the benefit of priority of U.S. Provisional Patent Application Ser. No. 60/634,428, entitled "A Model for Optimizing Total Merchandise Profitability," filed Dec. 8, 2004, and hereby incorporated by reference in its entirety

BACKGROUND OF THE INVENTION

Retailing can be an unpredictable business. This is especially true where fashion, fads or other volatile external factors drive purchasing decisions. Thus, for example, an article of clothing that is in vogue this month among teens may fall out of favor next month, only to become popular four months later among thirty-somethings.

To compensate for this, chain stores and other large retailers typically employ general merchandise managers (GMMs). These individuals are often responsible for setting overall merchandising, purchasing, pricing, and marketing strategies to improve the bottom line, e.g., in the face of changes in demand. GMMs are also responsible for allocating inventory for retail sites and making assortment decisions so that stock available throughout the buying season will meet but, preferably, not exceed demand.

Typically, a GMM (or other decision maker) is given an overall inventory budget from which, inter alia, to make purchasing and inventory allocation decisions, e.g., based on estimated sales, fashion trends, and current inventory levels. Often, those decisions are made on "gut feel" about how each retail site (e.g., store or department) and/or product is expected to fare in the upcoming season.

The art provides tools that can assist GMMs in this regard. Examples include commonly assigned U.S. Pat. No. 6,910,017, entitled "Inventory and Price Decision Support," issued Jun. 21, 2005; U.S. Pat. No. 6,834,266, entitled "Clustering," issued Dec. 21, 2004; and co-pending and commonly assigned U.S. Ser. No. 09/826,378, entitled "Assortment Decisions," filed Apr. 4, 2001; U.S. Ser. No. 10/165,041, entitled "Markdown Management," filed Jun. 7, 2002; U.S. Ser. No. 09/900,706, entitled "Price Decision Support," filed Jul. 6, 2001; U.S. Ser. No. 10/861,772, entitled "Methods And Apparatus For Retail Inventory Budget Optimization And Gross Profit Maximization," filed Jun. 4, 2004; U.S. Ser. No. 10/891,458, entitled "A Model for Optimizing In-Season Tactical Decisions," filed Jul. 14, 2004; U.S. Ser. No. 11/158,264, entitled "Methods and Apparatus for Optimizing Markdown Pricing," filed Jun. 21, 2005; the teachings of all of which are incorporated herein by reference.

However, even in instances where GMMs must determine the budget for a particular product (or site) based on such tools, they attempt to resolve the problem holistically. While a GMM might have a general idea of how popular a given product will be, the holistic approach can result in lost profit opportunities.

An object of this invention is to provide improved systems and methods for digital data processing.

Another object of the invention is to provide improved such systems and methods for use in retailing.

Still another object of the invention is to provide improved such systems and methods as improve opportunities to optimize total merchandise profitability.

Yet still another object of the invention is to provide improved such systems and methods as assist GMMs and other decision makers in their inventory assortment and pricing decisions.

SUMMARY OF THE INVENTION

The foregoing objects are among those attained by the invention, aspects of which provide systems and methods for optimizing total merchandise profitability. These systems and methods are based on modeling gross margin to a retail enterprise taking into account depth, breadth, and expected discount for classes of goods sold by the enterprise at its retail sites (e.g., retail stores or departments).

In one such aspect, the invention provides a method for optimizing merchandise profitability that includes the step of modeling gross margin as a function of product breadth and depth for each of at least one class of goods retailed by each of at least one retail site in a group of sites of the retail enterprise, and as a function of the expected discount price for each such class of goods at each such retail site. The method further includes maximizing the gross margin so modeled to the enterprise and, from that maximization, determining for at least one such retail site an optimal breadth, depth, and/or discount price, for at least one such class of goods retailed by it.

In related aspects of the invention, the modeling step includes modeling the gross margin, additionally, as function of one or more of the following: a presentation minimum for a class of goods retailed by each site in the group of sites, a price of each of such goods, a cost of each of such goods, a length of a selling period of each of such goods, a number of sites in each of the groups of sites, a price elasticity of demand faced by each of such goods, and/or the projected full-price weekly sales, as a function of breadth, for each of such goods.

The method further provides methods as described above in which the modeling step includes modeling the gross margin in accord with the relation:

$$GM\$ = \sum_c \sum_s N_s x_{cs}(P_{cs}(1 - d_{cs}) - C_{cs})$$

where $N_s$    represents a number of sites in each group of sites;
$x_{cs}$    represents total units to be bought for class of goods c at each site in each group of sites s;
$P_{cs}$    represents a full price for an average item in each class of goods c in each site in each group of sites;
$d_{cs}$    represents an expected discount for each class of goods c in each site in each group of sites s; and
$C_{cs}$    represents average cost goods in each class of goods c in each site in each group of sites s.

In related aspects of the invention, the method provides for constraining the gross margin so modeled such that a value of the depth for each class of goods at each such site is bounded by a value that is a function of (i) the breadth of that class at that site and of (ii) the presentation minimum of that class at that site.

Further related aspects of the invention provide methods as described above including constraining the gross margin so modeled such that a value of the depth for each class of goods at each such site in such group of sites is bounded by a value that is a function of an expected discount for each such class of goods at each site in such group of sites, and of the expected full-price weekly sales for each such class of goods at each such site in such group of sites, and of the price elasticity for each such class of goods at each such site in such group of sites.

Related aspects of the invention provide methods as described above in which expected full-price weekly sales for each such class of good at each such site is based on historical sales data. In further related aspects of the invention, the methods include using econometric demand modeling to determine the full-price weekly sales from that historical data.

Other aspects of the invention provide methods as described above including constraining the gross margin so modeled such that values for depth and breadth for each class of goods for each site are greater than or equal to zero, and constraining a value of the expected discount for each class of goods for each site in a group of sites to a range of zero to one.

Still other aspects provide for constraining the gross margin so modeled such that a total expected buying cost of all goods over all sites does not exceed a total budget; such that the expected buying cost for each class of goods does not exceed the a budget for that respective class of goods; such that the expected buying cost for each retail site does not exceed a budget for that respective retail site; and/or such that the buy for each group of sites does not exceed a value that is a function of the space available for the average site in that group of sites.

In further aspects, the invention provides a methods as described above further including constraining the gross margin so modeled such that total sales of all classes of goods in all sites is bounded by a value that is a function of (i) the depth of each such class of goods at each such site in such group of sites and of (ii) the expected discount of each such class of goods at each such site in such group of sites.

Still further aspects of the invention provide methods as described above including constraining the gross margin so modeled such that a sales target for each such class of goods is bounded by a value that is a function of (i) the depth of that class of goods in each such site in each such group of sites and of (ii) an expected discount of that class of goods in each such site.

In related aspects, the invention provides such a method including constraining the gross margin so modeled such that a sales target for the retail enterprise is bounded by a value that is a function of (i) the depth of each such class of goods in each such site in each such group of sites and of (ii) an expected discount of each such class of goods in each such site.

Yet other aspects of the invention provide methods for selecting an assortment of goods for allocation and/or display at a retail site based an optimal breadth, depth, and/or discount price determined in accord with the methods above.

Still other aspects of the invention provide digital data processing systems operating in accord with the methods above to facilitate optimizing total merchandise profitability for a retail enterprise.

These and other aspects of the invention are evident in the drawings and in the text that follows.

BRIEF DESCRIPTION OF THE DRAWINGS

A more complete understanding of the invention and, more particularly, of embodiments thereof, may be attained by reference to the drawings, in which.

DETAILED DESCRIPTION OF THE ILLUSTRATED EMBODIMENT

Figure 1:
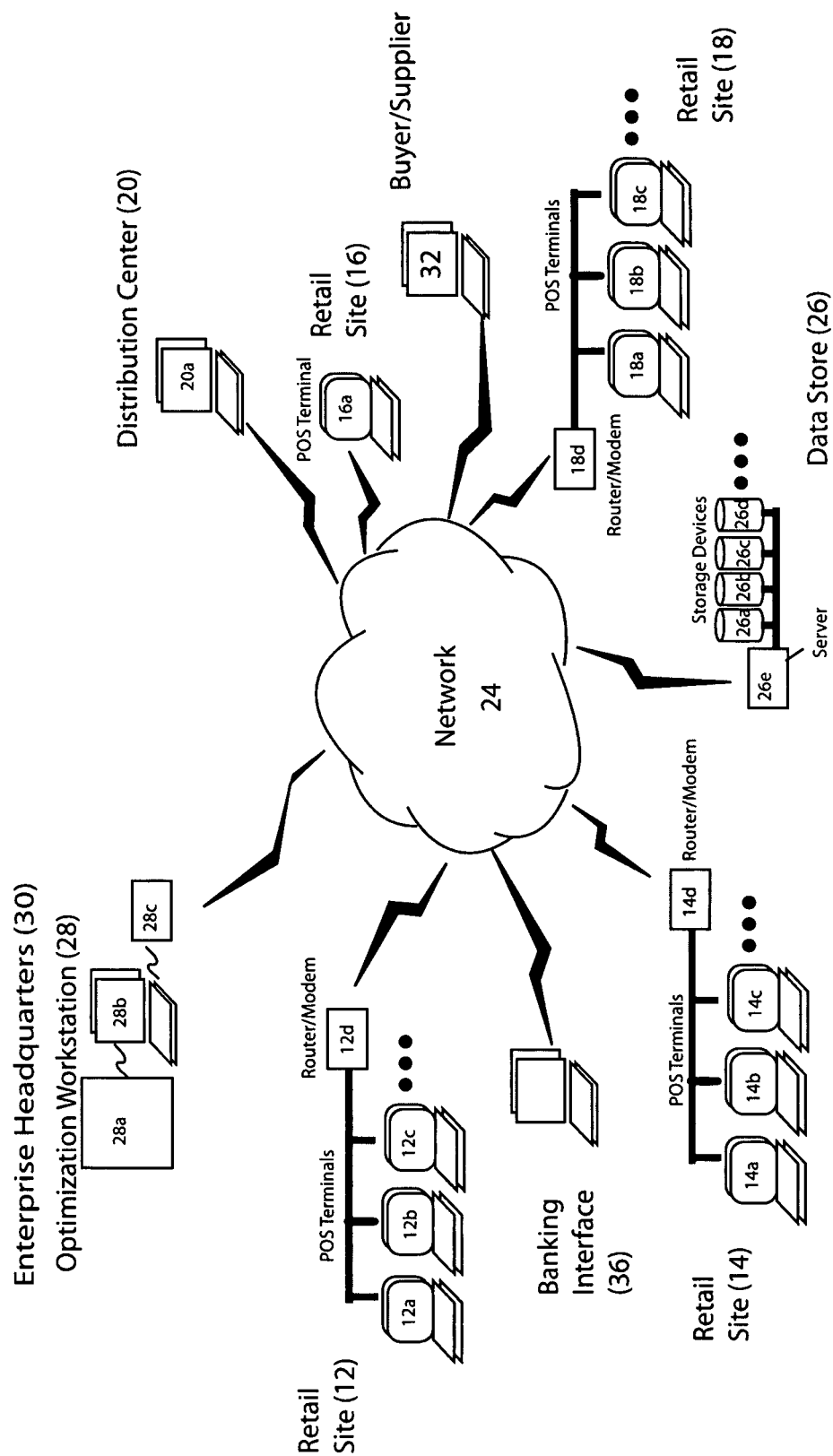
FIG. 1 illustrates a system according to the invention and an environment in which methods according to the invention can operate.

FIG. 1 depicts a digital data processing system according to one practice of the invention, as well as a digital data processing environment in which methods according to the invention can be practiced.

In the illustrated embodiment, that environment is a retailing enterprise of international, national, local (or other) scale comprising retail sites 12-18. That retailing enterprise (in this case, retail stores) can be a "chain" of commonly named and owned stores, though, it may be a looser (or tighter) collection of related stores, that are presumably (though not necessarily) under common control or management. Moreover, although the retail sites depicted and discussed here are stores, they may also be departments or other retail outlets (physical, virtual, online, or otherwise). In addition, the term "retail enterprise" as used herein can refer to all or a subset of the retail sites that make up the entire enterprise.

Retail sites 12-18 are conventional (or non-conventional) retail outlets, such as, by way of non-limiting example, clothing stores, department stores, jewelry stores, furniture stores, beauty supply shops, consumer electronics stores, and so forth. These sites can have their own budgets, inventories, and retail space, the assortment, allocation and pricing decisions for which are optimized with the methods and systems described herein.

Each retail site 12-18 can include one or more interconnected point of sale (POS) terminals 12a-18c. These provide for inventory tracking, as well as for pricing and collection of monies from retail patrons at the time of sale. Though POS terminals are used for these purposes in the illustrated embodiment, it will be appreciated that in other embodiments these functions may be exercised by other mechanisms known in the art, automated or otherwise.

Illustrated distribution center 20 is a central inventory location, such as a warehouse, from which goods are delivered to retail sites 12-18. That distribution center 20, further, can include a workstation 20a that tracks inventory. This can be a personal computer, mainframe, other digital data processor or apparatus of the type known in the art for inventory tracking.

Data store 26 represents a repository of inventory and sales information from retail sites 12-18, as well as inventory information from distribution center 20. This may be part of a general back office management function, e.g., that additionally includes overall corporate financial tracking and management, or otherwise. In the illustrated embodiment, the store 26 comprises storage devices 26a-26d, which are coupled to network 24, via server and/or data-base management system 26e. Information regarding inventory and sales therefrom is communicated from the POS terminals in each of the sites 12-18 to data store 26 via router/modems, as illustrated.

Network 24 comprises one or more networks or other communications media over which components 12-20, 26, 28, 30 and 32 communicate. In the illustrated embodiment, these comprise a local area network (LAN), wide area network (WAN), public network, private network, or a combination thereof, whether wireless, wired, satellite based or otherwise.

Illustrated optimization workstation 28 comprises processor section 28a (comprising a central processing unit, dynamic storage, input/output control, and the like), a monitor, keyboard and other user input/output devices 28b, and printers or other output devices 28c, networked or otherwise—again, all of the type commercially available in the marketplace. The workstation 28 is programmed or otherwise operated in accord with the teachings hereof for optimizing profitability and, in connection therewith, inventory allocation/assortment and/or pricing for retail sites 12-18.

Thus, for example, the workstation 28 can be coupled for communications with back office data store 26, via network 24 or otherwise, to gather sales and inventory information from sites 12-18 and distribution center 20. Workstation 28 uses that information to determine inventory allocation, assortment and/or pricing (e.g., as described below) that optimizes profitability for the enterprise, to output reports for review and implementation by personnel acting on the enterprise's behalf, and/or to directly implement optimal assortment and/or pricing decisions. Workstation 28, by way of further example, can send suggested inventory requirements to buyers, who procure the necessary goods. Alternatively, or additionally, data can be sent directly to suppliers, thereby providing them with greater lead times and data for estimating the future needs of the enterprise.

The configuration shown in FIG. 1 is merely an example of one of the many with which the invention may be practiced. For example, it will be appreciated that the physical and/or virtual locations of these sites may vary from that shown in the drawing. Thus, these sites may be distributed and/or co-located, physically, virtually or otherwise, in combinations other than shown here. Further, while illustrated environment 10 includes a variety of different types of sites, those skilled in the art will appreciate that choice of sites and their connectivity to the enterprise headquarters 30 and/or optimization workstation depends on the needs of the enterprise.

Traditionally retail enterprises have provided a budget for the various retail sites and/or for the various classes of goods, and then relied on GMMs or others (e.g., department or division managers) to optimize the inventory assortment. For example, if a retailer wished to double its investment in a particular category of goods, the GMM might guess at an optimal breadth, depth, and pricing strategy for those goods. However, in some cases making an estimation or "gut" decision leads to inefficient use of capital or even monetary losses.

As used herein, the terms "goods," "products" and the like typically refers to articles retailed by an enterprise; however, it also refers to the broader category of products, whether in the nature of articles, services or otherwise that such an enterprise retails. The term "class" or "classification" is used in the conventional retail/marketing sense to refer to a type of good (or service) retailed by the enterprise. The term "depth" refers to a quantity of goods of the same class. By way of example, for a given product or class of products, inventory depth can be increased or decreased by adjusting the size of lots purchased. The term "breadth" refers to variety of goods of a given type or class. For example, if the goods are t-shirts, breadth refers to how many different sizes (e.g., xsmall, small, medium, etc.) to carry and/or how many different styles to include (color, texture, type of neck, etc.). The expected or projected "discount" refers to the expected price markdown needed to sell the full inventory of a particular product. In the discussion below, discount is typically expressed as a percentage of full price.

The inventor has recognized that depth, breadth, and price interact in complicated and sometimes unexpected ways, particularly, when other constraints such as budget, sales targets, retail space, presentation minimums, or other factors are considered. To overcome drawbacks in the prior art, the systems and methods described herein use a model to optimize all three factors (breadth, depth, discount) over all or a portion of an enterprise's retail sites. In addition, the model allows the enterprise to include a variety of constraints that honor "comp" (i.e., comparative) sales growth, available budget, available space, presentation minimum, etc.

For example, given an increased budget for a particular class of goods, the model employed in the illustrated embodiment allows an enterprise to determine if retailers should double their depth at the current breadth or double the breadth at the current depth, or expand both breadth and depth. Moreover, the depth and breadth values can be determined over groups of retail sites. This is an important calculation since, if at the current breadth and depth, a retail site is close to exhausting its full price sales potential, then adding depth would be inefficient. The addition of depth would only lead to markdowns. Instead, the model will indicate that adding breadth would be the best way to generate incremental full-price demand. However, the model can also determine if adding breadth would be efficient. For example, adding breadth typically involves more fixtures on the sales floor (i.e., the new goods require retail space) and this results in some other class of goods losing floor space. The model might determine that adding some depth may be optimal since the additional depth will not require more fixtures/space, just more frequent replenishments.

In the illustrated embodiment of the invention, workstation 28—by way of non-limiting example—operates in accord with the methods described herein, utilizing the model discussed above (and further detailed below), to allow for optimization of profitability, by modeling gross margin as a function of, inter alia, depth, breadth and discount. By maximizing the gross margin so modeled, the workstation determines an optimal breadth, depth, and discount for the contemplated goods. The model is constrained such that the determined values result in an inventory allocation in which supply is in line with demand and in which presentation minimums are honored. The model is also constrained, in some embodiments, based on comp sales growth, available budget, available space, presentation minimum, among other factors.

Output from the workstation 28 executing that model can be, by way of non-limiting example, a chart of the type below, detailing the depth, breadth and expected discount for each class of goods (e.g., Class A, Class B, and so forth) retailed by each store (or other site) in the enterprise so that the total gross margin (GM$) dollars are maximized, while honoring constraints of the type mentioned above. Though the model can be executed on a store-by-store basis, a department-by-department basis, or otherwise, in the illustrated embodiment, it is executed on the basis of store group-by-store group (where each store group comprises one or more stores).

|  | Store Group 1 | Store Group 2 | Store Group . . . | Store Group n |
|---|---|---|---|---|
| Class A |  |  |  |  |
| Class B |  |  |  |  |
| Class . . . |  |  |  |  |
| Class Z |  |  |  |  |

Depending on implementation needs, the workstation 28 can accept and utilize a number of inputs for purposes of exercising the gross margin model. For example, inputs related to the retail sites can include presentation minimums (i.e., the minimum count of goods available for display to customers), store budget, display space, and/or number of stores. Further inputs can include, for example, expected, full retail price of the goods and/or the wholesale cost of the goods; space needed (fixture space) per item; projected or expected demand and the length of the selling season; price elasticity for each class of goods in each group of stores and/or estimated sales.

In the discussion that follows, these and other exemplary inputs are represented by the variables listed below. Other embodiments use a greater or lesser number of inputs, in addition to, or instead of, these:

| | |
|---|---|
| $PM_{cs}$ | presentation minimum for class c in each store of store group s |
| $P_{cs}$ | full price for the average item in class c in each store of store group s |
| $C_{cs}$ | unit cost for the average item in class c in each store of store group s |
| W | length of the selling season (e.g., weeks in selling season) |
| $N_s$ | number of stores |
| $\gamma_{cs}$ | price elasticity for class c items in each store of store group s |
| $D_{cs}(y_{cs})$ | expected full-price weekly sales for class c in each store of store group s as a function of breadth ($y_{cs}$) |

Likewise, in the discussion that follows, outputs from the model executed by workstation 28 are expressed by the variables below. Again, other embodiments may provide a greater or lesser number of outputs, instead or in addition:

| | |
|---|---|
| $x_{cs}$ | total units to be bought for class c in each store of store group s |
| $y_{cs}$ | breadth to be carried for class c in each store of store group s |
| $d_{cs}$ | expected discount for class c items in each store of the store group s |

More particularly, workstation 28 executes a model in which total sales and gross margin dollars ("GM") are defined as:

$$\text{Sales} = \sum_c \sum_s N_s x_{cs} P_{cs}(1 - d_{cs}) \qquad \text{Equation 1}$$

$$GM\$ = \sum_c \sum_s N_s x_{cs}(P_{cs}(1 - d_{cs}) - C_{cs}) \qquad \text{Equation 2}$$

The workstation finds optimum values for the outputs ($x_{cs}$, $y_{cs}$, $d_{cs}$) by maximizing GM$ in Equation 2. Those skilled in the art will appreciate there are a variety of ways to accomplish such a maximization, including by way of non-limiting example, use of general-purpose optimization tools such as Microsoft Excel's Solver.

During maximization, a variety of constraints are or can be imposed. In the illustrated embodiment, these require the model to (1) satisfy presentation minimums for the retailed goods, (2) keep supply and demand balanced, and (3) limit breadth and depth outputs to positive values.

For example, the breadth and depth can be limited such that the presentation minimum is met for each class and store group. This requires that the total units (i.e., goods) bought for each class in each store of the store groups be greater than or equal to the presentation minimum for the respective class and stores times the breadth to be carried for each class in each store of the respective store groups. In the illustrated embodiment, that constraint is defined by Equation 3, though in other embodiments it may be defined otherwise.

$$x_{cs} \geq y_{cs} PM_{cs} \; \forall s,c \qquad \text{Equation 3}$$

Workstation 28 of the illustrated embodiment further constraints the model such that supply and demand do not fall out of synchronization and specifically, for example, such that projected demand should not fall below supply for any product. In one embodiment, this constraint is achieved globally by comparing the total supply against the total demand such that store-to-store variations are not included in the calculations. In this case, it will be assumed that the distribution of goods can be adjusted if the demand within a single store or group of stores exceeds or fails to meet the supply earmarked for the particular store or group of stores. Alternatively, the calculation can be made on a store-by-store basis if the distribution system is not flexible enough to quickly adjust to store specific variations. In the illustrated embodiment of the invention, this constraint is defined by Equation 4, though in other embodiments it may be defined otherwise.

$$x_{cs} \leq (1 - d_{cs})^{-\gamma} W D_{cs}(y_{cs}) \; \forall s,c \qquad \text{Equation 4}$$

Still another constraint to Equation 2 is that the total units bought and the breadth to be carried cannot be negative. In addition, the expected discount should be between zero and one where it is expressed as a percentage of full sales price. Clearly, a negative depth or breadth and/or a positive discount would be nonsensical. In the illustrated embodiment, these constraints are defined by Equations 5a, 5b, and 5c, though in other embodiments they may be defined otherwise.

$$x_{cs} \geq 0 \; \forall s,c \qquad \text{Equation 5a}$$

$$y_{cs} \geq 0 \; \forall s,c \qquad \text{Equation 5b}$$

$$0 \leq d_{cs} \leq 1 \; \forall s,c \qquad \text{Equation 5c}$$

In addition to the above discussed constraints, a number of additional (optional) constraints can be imposed. Exemplary optional inputs for such additional constraints include:

| | |
|---|---|
| $S_c$ | chain-level sales target for class c (e.g., as a percentage value multiplied by year long comp sales) |
| S | chain-level sales target for department as a whole (e.g., as a percentage value multiplied by year long comp sales) |
| B | total investment budget |
| $B_{cs}$ | budget for class c in store group s |
| $B_s$ | total budget for store group s |
| $B_c$ | total budget for class c |
| $F_c$ | spaced needed (F stands for fixture) per class c item |
| $AR_s$ | available space in each store of store-group s |
| $R_s$ | number of replenishments in season for stores in store-group s |

In the illustrated embodiment, the additional constraints relate to the comp sales targets. For example, the model can be limited to outcomes which meet the total sales and/or the sales targets for individual classes of goods. Here, these constraints are defined by Equations 6 and 7, respectively, though in other embodiments they may be defined otherwise.

$$\sum_c \sum_s N_s x_{cs} P_{cs}(1 - d_{cs}) \geq S \qquad \text{Equation 6}$$

$$\sum_s N_s x_{cs} P_{cs}(1 - d_{cs}) \geq S_c \qquad \text{Equation 7}$$

Budget guidelines can also provide useful constraints. For example, the model can be limited to outcomes where the total buy does not exceed the total budget. In the illustrated embodiment, Equation 8 provides one such constraint, though in other embodiments that constraint may be defined otherwise.

$$\sum_c \sum_s C_{cs} x_{cs} \le B \qquad \text{Equation 8}$$

Alternatively, or additionally, the buy for an individual store, class of goods, and/or class/store group combination can be limited by their respective budget's. In the illustrated embodiment, these budget constraints are defined by Equations 9 through 11, respectively, though in other embodiments the may be defined otherwise.

$$\sum_c C_{cs} x_{cs} \le B_s \quad \forall s \qquad \text{Equation 9}$$

$$\sum_s C_{cs} x_{cs} \le B_c \quad \forall c \qquad \text{Equation 10}$$

$$C_{cs} x_{cs} \le B_{cs} \; \forall s,c \qquad \text{Equation 11}$$

Space availability with the individual retail stores can also limit the model since the buy should not exceed the space capacity for the stores. Clearly, inventory will need to work its way through the supply chain and some excess inventory can be stored in the distribution center. However, inventory should be mostly on-hand during the sales period for which the inventory was purchased. In some embodiments, the available space constraint requires the buy to be equal to or less than the average space capacity for the average store in each store group. Equation 12 expresses this limitation and is used with Equation 2 of the illustrated embodiment to limit the model, though other embodiments may express this limitation otherwise.

$$\sum_c x_{cs} F_c \le AF_s R_s \quad \forall s \qquad \text{Equation 12}$$

If budget or space constraints are not included in the model, then it is possible that the model would recommend excessively high breadth or depth values. These values can be constrained if necessary. However, high depth values would imply high discount (due to the constraint on supply exceeding demand), leading to a negative GM value. Since a negative GM value would not be chosen (i.e., GM is being maximized), constraints on excessively high depth values are optional.

If none of the optional constraints are included (i.e., Equations 6 through 12), then the model can be applied separately for individual class/store groups. The model can be split into several independent assortment breadth/depth models, one for each class-store group. Alternatively, at least some of the optional constraints are included and used to restrict the values output by maximizing Equation 2. In this case, the outputs are calculated across multiple store groups and classes of goods.

In some embodiments of the invention, the workstation 28 employs a methodology wherein prior sales data is used to determine price elasticity and/or expected full-price weekly sales as a function of breadth, i.e., $D_{cs}$. These sales response functions can be determined in a variety of ways, such as, for example by applying standard economic demand modeling techniques. Once the sales response functions are so determined, they can be solved by non-linear programming methods or other mathematical tools and methods. The number of variables will be on the order of thousands where the number of stores is, for example, in the range of 1 to 100 and the number of classes of goods is for example 10 to 1000.

Figure 2:
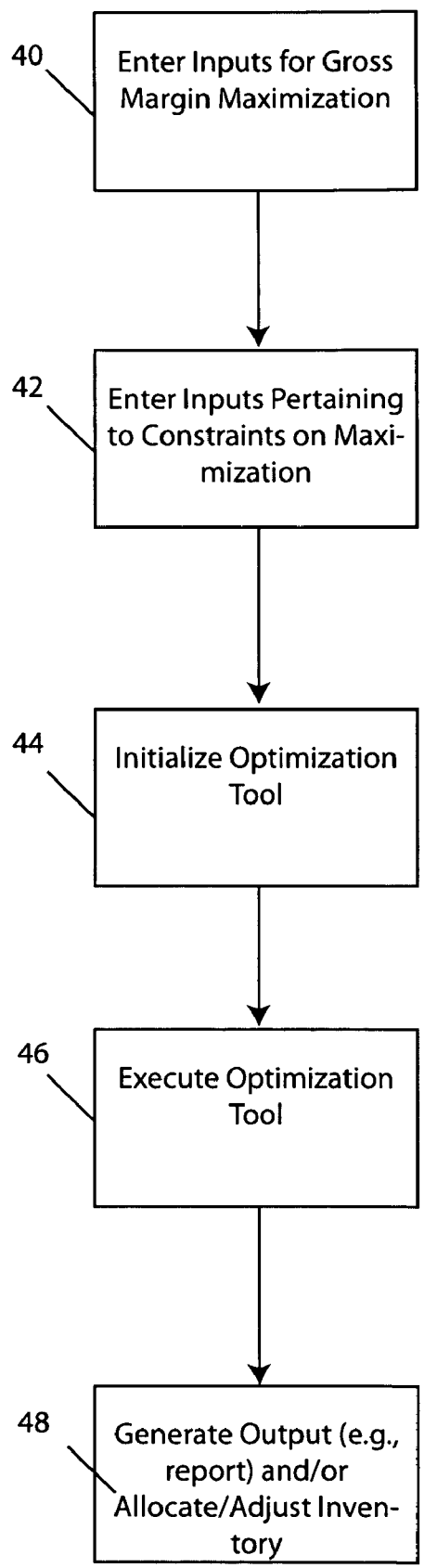
FIG. 2 is a flow chart depicting a method according to the invention.

FIG. 2 is a flow chart showing steps executed by illustrated workstation 28 in optimizing the gross margin model—and thereby determining an optimum inventory assortment and discount price—for a current or future sales period. Those skilled in the art will appreciate that a different set and/or sequence of steps can be executed in accord with the teachings hereof.

In step 40, workstation 28 accepts inputs of the type defined above for the Gross Margin maximization model itself, e.g., Equation 2. These inputs can be entered by a user operating a keyboard, loaded from a file stored in data store 26, downloaded or obtained directly from retail sites 12-18, or otherwise.

In step 42, the workstation accepts inputs pertaining to the constraints to be used in determining optimal depth, breadth, and discount pricing while maximizing the model. These constraints can be preprogrammed and/or entered by a user as described above. In the illustrated embodiment, constraints related to presentation minimums, demand as a function of supply, and minimum values (i.e., non negative values) for depth and breadth are preprogrammed. The user can then chose, if desired, additional constraints, e.g., as discussed above, related to budget, sales targets, retail space, and/or otherwise.

In step 44, the workstation initializes an optimization tool. In the illustrated embodiment, this is Microsoft Excel's Solver, though other maximization tools can be used instead or in addition. Where Microsoft Excel is used, the following can be identified:

- A cell(s) defining the metric to be maximized by Solver (or other maximizing tool). In one embodiment these cells define gross margin as expressed by Equation 2.
- An array of cells defining the inputs, including, for example, a presentation minimum for a class of goods in each store in a group of stores, a price for the goods, a cost for the goods, a length of the selling period, a number of stores in each of the groups of stores, a price elasticity, projected full-price weekly sales as a function of breadth, and combinations thereof.
- Cells defining the variables based on the various inputs. These cells can include variables or values defined as a function of another variable and/or values.
- Cells defining constraints, such as, for example, the constraints expressed in Equations 3 through 12.

In step 46, the optimization tool is executed in order to maximize gross margin in view of the above described constraints. Assuming a valid solution exists, the optimal values for breadth, depth, and/or price discount will result.

In step 48, the output generated by the optimization tool can be presented in a report for use by the GMM, CFO, store manger, inventory manager, buyer, supplier or other decision maker in determining budget allocations, breadth, depth, and/ or discount for the individual departments that maximize profitability in the current or upcoming period. For example, the report can be sent to a purchasing manager for procuring inventory in line with the inventory assortment suggested by the optimum breadth, depth, and price discount. The report can also be used a distribution manager to determine the proper allocation of inventory such that an optimum inventory assortment is delivered to retail sites. In addition, a retail manager at a retail site can receive the report and use the displayed information to determine which goods to display. Alternatively, or in addition, the set of inventory assortment/budget figures is delivered to an accounting and/or banking interface module 36. e.g., as shown in FIG. 1, which automatically or semi-automatically funds (e.g., via e-commerce, electronic or other communications with accounting and/or banking systems, as indicated in the drawing) actual or virtual bank accounts from which the respective departments draw for purposes of inventory acquisition.

Those skilled in the art will appreciate further features and advantages of the invention based on the above-described embodiments. Accordingly, the invention is not to be limited by what has been particularly shown and described, except as indicated by the appended claims.

What is claimed is:

1. A non-transitory computer readable medium that stores instructions that when executed by a computer cause the computer to perform a method for optimizing merchandise profitability, the method comprising:
   A. modeling gross margin for a retail enterprise as a function of at least
      i. product breadth and product depth for each of at least one class of goods retailed by each of at least one retail site in a group of sites of that retail enterprise, wherein each group of sites comprises one or more retail sites, and
      ii. expected discount price for each such class of goods at each such retail site in such group of sites,
   wherein the modeling includes modeling the gross margin in accordance with the relation:

$$GM\$ = \sum_c \sum_s N_s x_{cs}(P_{cs}(1-d_{cs}) - C_{cs})$$

where
      GM$ represents gross margin for the retail enterprise;
      $N_s$ represents a number of sites in each such group of sites;
      $x_{cs}$ represents total units to be bought for class of goods c at each such site in such group of sites s;
      $P_{cs}$ represents a full price for an average item in class of goods c in each such site in each such group of sites;
      $d_{cs}$ represents an expected discount for each such class of goods c in each such site in each such group of sites; and
      $C_{cs}$ represents average cost for goods to be bought for each such class of goods c in such site in such group of sites s;
   B. constraining the gross margin so modeled,
   C. determining and generating, for at least one such retail site in such group of sites, an optimal product breadth, optimal product depth, and optimal discount price, of at least one such class of goods retailed by that site, wherein the determining step includes maximizing the gross margin for the retail enterprise.

2. The non-transitory computer readable medium of claim 1, wherein the constraining step includes constraining the gross margin so modeled such that
   i. presentation minimums for each such class of goods are satisfied at each such retail site in such group of sites,
   ii. expected demand for each such class of goods at each such retail site in such group of sites does not fall below supply of that class of goods at that site, where the expected demand is determined as a function of product breadth and price discount of that class of goods at that retail site,
   iii. an expected buying cost of the goods does not exceed a budget therefor,
   iv. a sales target for the goods is a function of comparative sales of those goods over a prior selling period,
   v. a number of units of goods to be bought does not exceed a value that is a function of the space available therefor.

3. The non-transitory computer readable medium of claim 1, wherein the modeling step includes modeling the gross margin, further, as function of one or more of: a presentation minimum for a class of goods in at least one site in a group of sites, a full price of an average item in each class of goods in at least one site in a group of sites, a unit cost of an average item in each class of goods in at least one site in a group of sites, a length of a selling season for the retail enterprise, a number of sites in each of the groups of sites, a price elasticity of demand faced by goods in each class in at least one site in a group of sites, and expected full-price weekly sales for goods in each class of goods in at least one site in a group of sites as a function of breadth for each of such goods.

4. The non-transitory computer readable medium of claim 1, wherein step (B)(i) includes constraining the gross margin so modeled such that a value of the depth for each class of goods at each such site is bounded by a value that is a function of the breadth of that class at that site and of the presentation minimum of that class at that site.

5. The non-transitory computer readable medium of claim 1, wherein step (B)(i) includes constraining the gross margin so modeled such that the depth for each such class of goods at each such site satisfies the relation:

$$x_{cs} \geq y_{cs} PM_{cs} \ \forall s, c$$

where,
      $x_{cs}$ represents total units to be bought for class of goods c at each such site in such group of sites s;
      $y_{cs}$ represents the breadth of class of goods c at each such site in such group of sites s; and
      PM represents the presentation minimum for each class of goods c at each such site in such group of sites s.

6. The non-transitory computer readable medium of claim 1, wherein step (B)(ii) includes constraining the gross margin so modeled such that a value of the depth for each class of goods at each such site in such group of sites is bounded by to a value that is a function of an expected discount for each such class of goods at each site in such group of sites, and of the expected full-price weekly sales for each such class of goods at each such site in such group of sites, and of the price elasticity for each such class of goods at each such site in such group of sites.

7. The non-transitory computer readable medium of claim 1, wherein step (B)(ii) includes constraining the gross margin so modeled such that the depth for each such class of goods at each such site satisfies the relation:

$$x_{cs} \leq (1-d_{cs})^{-y_{cs}} W D_{cs}(y_{cs}) \ \forall s,c$$

where,
      $x_{cs}$ represents total units to be bought for each such class of goods c in such site in such group of sites s;
      $d_{cs}$ represents expected discount for class of goods c in such site in such group of sites s;
      W represents a length of a selling season for the retail enterprise; and $D_{cs}(y_{cs})$ represents expected full-price weekly sales for such class of goods c in each such site in such group of sites s as a function of breadth ($y_{cs}$).

8. The non-transitory computer readable medium method of claim 7, further comprising the step of determining the expected full-price weekly sales $D_{cs}(y_{cs})$ for each such class of good at each such site based on historical sales data.

9. The non-transitory computer readable medium of claim 7, further comprising the step of determining the expected full-price weekly sales $D_{cs}(y_{cs})$ for each such class of good at each such site by applying econometric demand modeling techniques to sales data.

10. The non-transitory computer readable medium of claim 1, wherein step (B) further includes constraining the gross margin so modeled such that values for depth and breadth for each class of goods for each site are greater than or equal to zero and constraining a value of the expected discount for each class of goods for each site in a group of sites to a range of zero to one.

11. The non-transitory computer readable medium of claim 1, wherein step (B) further includes the step of constraining the gross margin so modeled such that a total of expected buying cost of all goods over all sites does not exceed a total budget.

12. The non-transitory computer readable medium of claim 1, wherein step (B) further includes the step of constraining the gross margin so modeled such that the total expected buying cost for all the classes of goods for all the retail sites satisfies the relation $$\sum_c \sum_s C_{cs} x_{cs} \leq B$$

where, $x_{cs}$ represents total units to be bought for each such class of goods c in such site in such group of sites s;

$C_{cs}$ represents average cost for goods to be bought for each such class of goods c in such site in such group of sites s; and B represents total budget.

13. The non-transitory computer readable medium of claim 1, wherein step (B) further includes the step of constraining the gross margin so modeled such that the expected buying cost for each class of goods does not exceed the a budget for that respective class of goods.

14. The non-transitory computer readable medium of claim 1, wherein step (B) further includes the step of constraining the gross margin so modeled such that the expected buying cost for each retail site does not exceed a budget for that respective retail site.

15. The non-transitory computer readable medium of claim 1, wherein step (B) further includes the step of constraining the gross margin so modeled such that a total number of units to be bought for each group of sites does not exceed a value that is a function of the space available for the average site in that group of sites.

16. The non-transitory computer readable medium of claim 1, wherein step (B) further includes the step of constraining the gross margin so modeled such that the total buy for each group of sites satisfies the relation $$\sum_c x_{cs} F_c \leq AF_s R_s$$

where, $x_{cs}$ represents total units to be bought for each such class of goods c in such site in such group of sites s;

$F_c$ represents space needed for each item in class of goods c;

$AF_s$ represents available space in each such site in each such group of sites s; and $R_s$ represents the number of replenishments in a selling time period for each such site in each such group of sites s.

17. The non-transitory computer readable medium of claim 1, wherein step (B) further includes the step of constraining the gross margin so modeled such that total sales of all classes of goods in all sites is bounded by a value that is a function of the depth of each such class of goods at each such site in such group of sites and of the expected discount of each such class of goods at each such site in such group of sites.

18. The non-transitory computer readable medium of claim 1, wherein step (B) further includes the step of constraining the gross margin so modeled such that a sales target for the retail enterprise satisfies the relation $$\sum_c \sum_s N_s x_{cs} P_{cs} (1 - d_{cs}) \geq S$$

where, $x_{cs}$ represents total units to be bought for each such class of goods c in such site in such group of sites s;

$N_s$ represents a number of sites in each such group of sites;

$P_{cs}$ represents a full price for an average item in class of goods c in each such site in each such group of sites;

$d_{cs}$ represents an expected discount for each such class of goods c in each such site in each such group of sites s; and S represents a sales target for the retail enterprise.

19. The non-transitory computer readable medium of claim 1, wherein step (B) further includes the step of constraining the gross margin so modeled such that a sales target for each such class of goods is bounded by a value that is a function of the depth of that class of goods in each such site in each such group of sites and of an expected discount of that class of goods in each such site.

20. The non-transitory computer readable medium of claim 1, wherein step (B) further includes the step of constraining the gross margin so modeled such that a sales target for the retail enterprise is bounded by a value that is a function of the depth of each such class of goods in each such site in each such group of sites and of an expected discount of each such class of goods in each such site.

21. The non-transitory computer readable medium of claim 1, further comprising the step of selecting an assortment of goods for allocation to a retail site based on the optimal product breadth, the optimal product depth, and the optimal product discount price determined in step (C).

22. The non-transitory computer readable medium of claim 1, further comprising the step of selecting an assortment of goods for display at retail site based on the optimal breadth, depth, and discount price determined in step (C).

23. The non-transitory computer readable medium of claim 1, further comprising the step of selecting goods for display at a said retail site based on the optimal breadth, depth, and discount price determined in step (C).

24. The non-transitory computer readable medium of claim 1, where the product breadth represents a variety of a given type of product, and where the product depth represents a quantity of the given type of product.

25. A non-transitory computer readable medium that stores instructions that when executed by a computer cause the computer to perform a method for optimizing merchandise profitability, the method comprising:

A. modeling gross margin for a retail enterprise in accord with the relation:

$$GM\$ = \sum_c \sum_s N_s x_{cs}(P_{cs}(1-d_{cs}) - C_{cs})$$

where

GM$ represents gross margin for the retail enterprise;

$N_s$ represents a number of sites in each such group of sites;

$x_{cs}$ represents total units to be bought for class of goods c at each such site in such group of sites s;

$P_{CS}$ represents a full price for an average item in class of goods c in each such site in each such group of sites;

$d_{cs}$ represents an expected discount for each such class of goods c in each such site in each such group of sites s; and $C_{cs}$ represents average cost for goods to be bought for each such class of goods c in such site in such group of sites s;

B. constraining the gross margin so modeled such that i. a depth for each such class of goods at each such site satisfies the relation:

$x_{cs} \geq y_{cs} PM_{cs}$ $\forall s,c$ where, $x_{cs}$ represents total units to be bought for class of goods c at each such site in such group of sites s;

$y_{cs}$ represents the breadth of class of goods c at each such site in such group of sites s; and PM represents the presentation minimum for each class of goods c at each such site in such group of sites s;

ii. expected demand for each such class of goods at each such retail site in such group of sites does not fall below supply of that class of goods at that site in accord with the relation:

$x_{cs} \leq (1-d_{cs})^{-y_{cs}} W D_{cs}(y_{cs})$ $\forall s,c$ where, $x_{cs}$ represents total units to be bought for each such class of goods c in such site in such group of sites s;

$d_{cs}$ represents expected discount for class of goods c in such site in such group of sites s;

W represents a length of a selling season for the retail enterprise; and $D_{cs}(y_{cs})$ represents expected full-price weekly sales for such class of goods c in each such site in such group of sites s as a function of breadth ($y_{cs}$), iii. values for depth and breadth for each class of goods for each site are greater than or equal to zero, iv. a value of an expected discount for each class of goods for each site in a group of sites to a range of zero to one, and C. determining, for at least one such retail site in such group of sites, an optimal breadth, optimal depth, and optimal discount price, of at least one such class of goods retailed by that site, wherein the determining step includes maximizing the gross margin for the retail enterprise.

* * * * *

UNITED STATES PATENT AND TRADEMARK OFFICE
CERTIFICATE OF CORRECTION

| | | |
|---|---|---|
| PATENT NO. | : 7,895,067 B2 | Page 1 of 1 |
| APPLICATION NO. | : 11/297796 | |
| DATED | : February 22, 2011 | |
| INVENTOR(S) | : Ramakrishnan | |

It is certified that error appears in the above-identified patent and that said Letters Patent is hereby corrected as shown below:

In column 1, line 11, after "entirety" insert -- . --.

In column 7, line 13, delete "use" and insert -- may use --, therefor.

In column 10, line 61, delete "manger," and insert -- manager, --, therefor.

In column 13, line 4, in Claim 8, after "medium" delete "method".

In column 15, line 32, in Claim 25, delete "$P_{CS}$" and insert -- $P_{cs}$ --, therefor.

Signed and Sealed this
Fourth Day of October, 2011

David J. Kappos
*Director of the United States Patent and Trademark Office*